April 17, 1928.  H. F. JOHNSON  1,666,454
FENCEPOST PULLER
Filed April 2, 1927
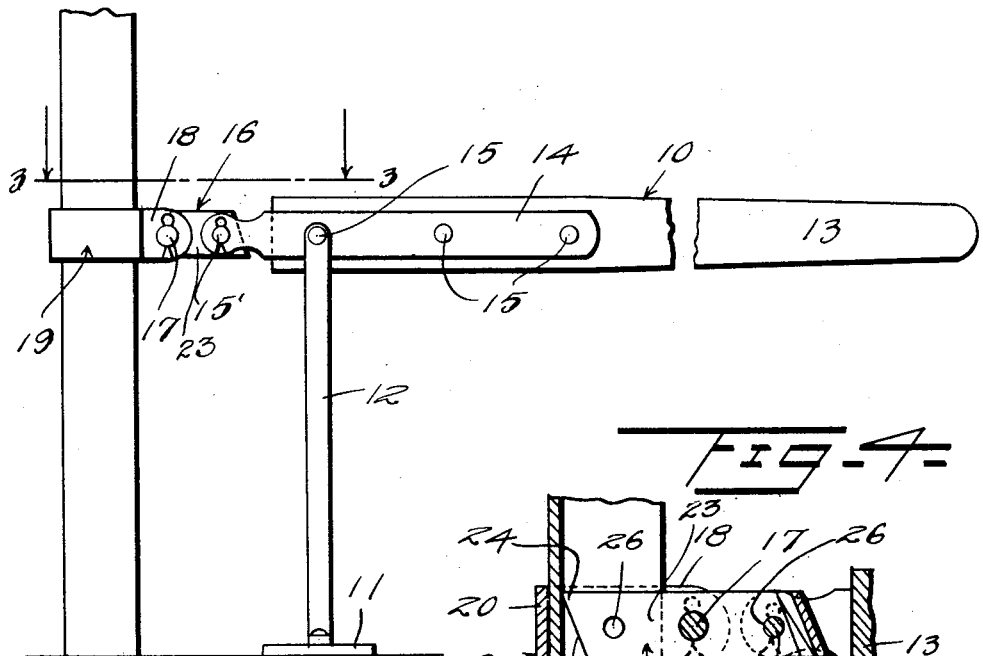
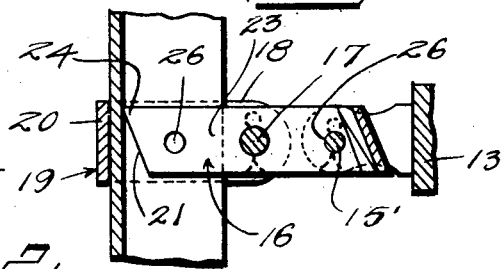
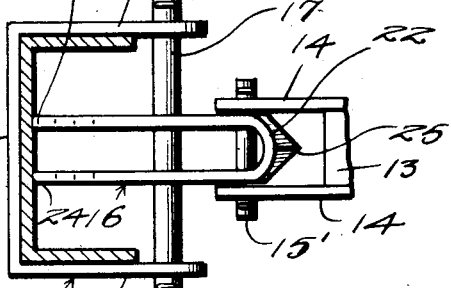
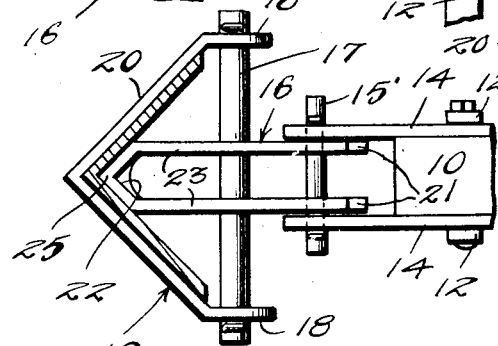
Inventor
H. F. Johnson
By Watson E. Coleman
Attorney Patented Apr. 17, 1928.

1,666,454

UNITED STATES PATENT OFFICE.

HJALMAR F. JOHNSON, OF BISMARCK, NORTH DAKOTA.

FENCE-POST PULLER.

Application filed April 2, 1927. Serial No. 180,489.

This invention relates to fence post pullers.

An important object of this invention is to produce a device of this character, which may be operated as a jack and will intermittently grip and release the post, as the operating handle is moved downwardly and upwardly, so that the post is forced upwardly step by step without any damage thereto.

A further object of the invention is to provide a device of this character which may be very cheaply and readily manufactured, which will be durable and efficient in service and a general improvement in the art.

These and other objects I attain by the construction shown in the accompanying drawings, wherein for the purpose of illustration is shown a preferred embodiment of my invention and wherein:—

Figure 1 is a side elevation of a fence post puller constructed in accordance with my invention applied to a post to extract the same from the ground;

Figure 2 is an enlarged vertical sectional view through the operating end of the extractor;

Figure 3 is a section on the line 3—3 of Figure 1;

Figure 4 is a section similar to that shown in Figure 2, but with the dog reversed for use in connection with a different type of post;

Figure 5 is a view similar to that shown in Figure 3 showing the device in use with a different type of post.

Referring now more particularly to the drawings, the numeral 10 generally designates a lever pivotally connected with a ground engaging foot 11 by arms 12 arising from the foot. The lever 10 is at present illustrated as composed of a wooden handle section 13 and an extension comprising plates 14 secured to opposite sides of the handle 13 and projecting beyond the ends thereof. One of the bolts 15, which secure the plates 14 in position upon the handle, serves as a pivot for the upper ends of the arms 12.

Directed through the ends of the plates 14 is a pivot 15′ for a U-shaped dog 16. Through the U-shaped dog 16 is directed a pivot bolt 17 receiving the arms 18 of a U-shaped clevis 19. The cross bar 20 of the U-shaped clevis 19 is shaped to correspond to the shaping of the post, with which it is to be employed. In Figure 3, the clevis is shown as constructed for use with angle iron posts and the cross bar is of angular formation, while in Figure 5, the clevis is adapted for use with channel or T-iron posts and is flat. The dog 16 has the ends of the arms thereof bevel-cut, as indicated at 21. The cross bar 22 of this dog is V-shaped and at an angle to the longitudinal centers of the arms 23 similar to the angle at which the arms 21 are cut.

In the use of the device, the proper clevis and end of the dog being arranged in position, the upper end of the post is extended between the clevis and dog and the entire device slid downwardly until the foot 11 comes in engagement with the ground. The handle end of the lever is then oscillated vertically and as this handle is depressed, the dog will tend to swing about its pivot upon the bolt 17, so that the nose 24 or 25 of the operating end engages against the adjacent face of the post and acts, with the cross bar 20 of the clevis, to clamp the post, so that as the post confronting end of the handle 10 rises, the post rises therewith. As the handle end of the lever is moved upwardly, the frictional engagement of the clevis with the post will tend to retard downward movement thereof, with the result that the pivot 15 will move downwardly with respect to the pivot 17, thus rocking the dog 16, so that the nose 24 or 25 is disengaged from the post and the clevis released from the post, so that it may slide downwardly thereon.

It will, of course, be understood that the dog 16 will be reversed when employed with angle iron posts from the position which it will occupy when it is employed with either T-iron or channel iron posts. When employed with an angle iron post, the cross bar end 25 confronts the post and when employed with the latter types of posts, the ends of the arms confront the posts, the pivot pin 17 being engaged in the proper openings 26 of the dog arms. When used with channel iron posts, the noses 24 of the arms engage the inner face of the base of the channel, while the cross bar of the clevis engages the outer face thereof and when employed with T-iron posts, the ends of the arms engage the head of the T at opposite sides of the stem thereof, while the clevis engages the outer face of the head of the T. It will, of course, be understood that instead of employing the reversible dog 16 as illustrated, separate dogs may be employed, if so desired.

Since the construction hereinbefore set forth is capable of a certain range of change and modification without materially departing from the spirit of the invention, I do not limit myself to such specific structure except as hereinafter claimed.

I claim:—

1. In combination, a lever, a ground engaging fulcrum therefor and permanently pivotally connected therewith, a U-shaped dog, a pivot extending through the arms of the dog adjacent one end thereof and through one end of the lever, a pivot carried by the dog at the approximate center thereof, a clevis having arms engaging said pivot and a cross bar confronting the free end of the dog, the free end of the dog and cross bar of the clevis being constructed for clamping engagement with opposite faces of a fence post.

2. In combination, a lever, a ground engaging fulcrum therefor and permanently pivotally connected therewith, a U-shaped dog, a pivot extending through the arms of the dog adjacent one end thereof and through one end of the lever, a pivot carried by the dog at the approximate center thereof, a clevis having arms engaging said pivot and a cross bar confronting the free end of the dog, the free end of the dog and cross bar of the clevis being constructed for clamping engagement with opposite faces of a fence post, the ends of the arms remote from the cross bar of said clevis being bevel-cut to produce projecting noses equally spaced from the pivot, the cross bar of the dog having a V-shaped projecting nose.

In testimony whereof I hereunto affix my signature.

HJALMAR F. JOHNSON.